US012395232B2

(12) United States Patent
Barton et al.

(10) Patent No.: US 12,395,232 B2
(45) Date of Patent: Aug. 19, 2025

(54) BACKSCATTER DEVICE PLACEMENT AND PLACEMENT CALIBRATION

(71) Applicant: Cisco Technology, Inc., San Jose, CA (US)

(72) Inventors: Robert E. Barton, Richmond (CA); Domenico Ficara, Essertines-sur-Yverdon (CH); Amine Choukir, Lausanne (CH); Jerome Henry, Pittsboro, NC (US); Ugo Mario Campiglio, Morges (CH)

(73) Assignee: Cisco Technology, Inc., San Jose, CA (US)

( * ) Notice: Subject to any disclaimer, the term of this patent is extended or adjusted under 35 U.S.C. 154(b) by 179 days.

(21) Appl. No.: 18/460,410

(22) Filed: Sep. 1, 2023

(65) Prior Publication Data
US 2024/0378407 A1 Nov. 14, 2024

Related U.S. Application Data

(60) Provisional application No. 63/501,796, filed on May 12, 2023.

(51) Int. Cl.
H04B 7/155 (2006.01)
G06K 19/07 (2006.01)
(Continued)

(52) U.S. Cl.
CPC ......... *H04B 7/155* (2013.01); *G06K 19/0708* (2013.01); *H02J 50/001* (2020.01); *H02J 50/20* (2016.02)

(58) Field of Classification Search
CPC ... H04B 7/155; G06K 19/0708; H02J 50/001; H02J 50/20
See application file for complete search history.

(56) References Cited

U.S. PATENT DOCUMENTS

2015/0091706 A1* 4/2015 Chemishkian ..... G06K 7/10158 340/10.34
2018/0032768 A1* 2/2018 Ganesan ............ G06K 7/10297
(Continued)

OTHER PUBLICATIONS

International Search Report and Written Opinion for International Application No. PCT/US2024/028690, mailed Sep. 12, 2024, 12 Pages.
(Continued)

*Primary Examiner* — Curtis A Kuntz
*Assistant Examiner* — James E Munion
(74) *Attorney, Agent, or Firm* — Merchant & Gould P.C.

(57) ABSTRACT

Backscatter Device (BKD) placement and placement calibration may be provided. A plurality of ambient energy sources in a Three-Dimensional (3D) space may be identified and mapped. Each of the plurality of ambient energy sources may be categorized as one of the following: a stationary and controllable ambient energy source, a stationary and uncontrollable ambient energy source, and a mobile ambient energy source. An amount of ambient energy available at each of a plurality of sub-spaces of the 3D space may be determined. The amount of ambient energy available at each of the plurality of sub-spaces may be determined by determining a first amount of ambient energy that is continuously available and a second amount of ambient energy that is likely available at each of the plurality of sub-spaces of the 3D space.

20 Claims, 4 Drawing Sheets

(51) Int. Cl.
    *H02J 50/00*         (2016.01)
    *H02J 50/20*         (2016.01)

(56) References Cited

U.S. PATENT DOCUMENTS

| | | | |
|---|---|---|---|
| 2019/0044392 A1* | 2/2019 | Chowdhury | |
| 2020/0195058 A1* | 6/2020 | Elangovan | H02J 50/20 |
| 2020/0412591 A1 | 12/2020 | Lopez et al. | |
| 2022/0225402 A1* | 7/2022 | Elkotby | H02J 50/20 |
| 2023/0059954 A1* | 2/2023 | Park | |
| 2023/0097295 A1 | 3/2023 | Shao | |

OTHER PUBLICATIONS

Yang B.B., et al., "Wireless Power Transmission and Energy Harvesting for IoT Applications", IEEE, Doc. IEEE 802.11-22/1294r1, 11-22-1294-01-0AMP-WIRELESS-POWER-TRANSMISSION-AND-ENERGY-HARVESTING-FOR-IOT-APPLICATIONS, IEEE-SA Mentor, Piscataway, NJ USA, vol. 802.11 AMP, No. 1, Aug. 16, 2022, pp. 1-15, XP068193329, Retrieved from https://mentor.ieee.org/802.11/dcn/22/11-22-1294-01-0amp-wireless-power-transmission-and-energy-harvesting-for-iot-applications.pptx on Aug. 16, 2022, The Whole document.

* cited by examiner

BACKSCATTER DEVICE PLACEMENT AND PLACEMENT CALIBRATION

RELATED APPLICATION

Under provisions of 35 U.S.C. § 119(e), Applicant claims the benefit of U.S. Provisional Application No. 63/501,796, filed May 12, 2023, which is incorporated herein by reference.

TECHNICAL FIELD

The present disclosure relates generally to processes for Backscatter Device (BKD) placement and placement calibration.

BACKGROUND

In computer networking, a wireless Access Point (AP) is a networking hardware device that allows a Wi-Fi compatible client device to connect to a wired network and to other client devices. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home, or school often required running many cables through walls and ceilings in order to deliver network access to all of the network-enabled devices in the building. With the creation of the wireless AP, network users are able to add devices that access the network with few or no cables. An AP connects to a wired network, then provides radio frequency links for other radio devices to reach that wired network. Most APs support the connection of multiple wireless devices. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
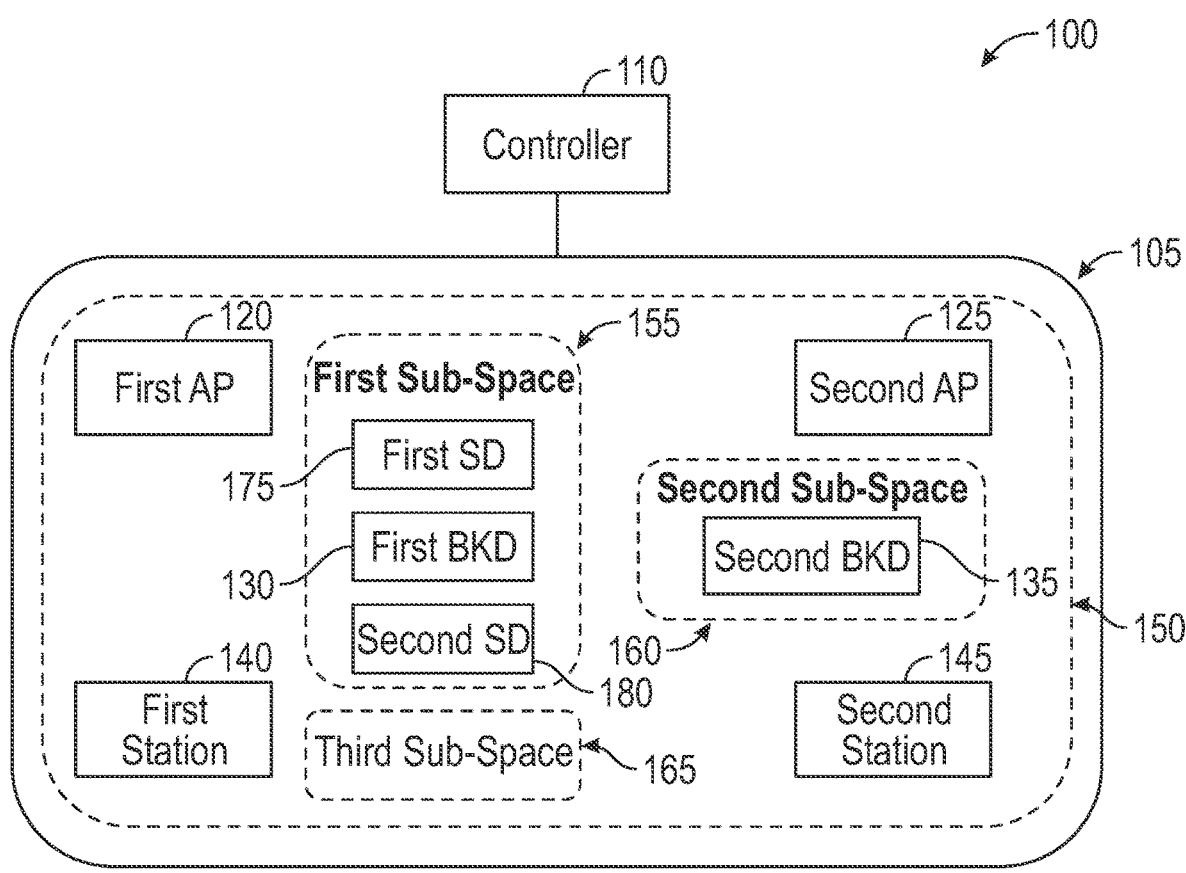
FIG. 1 is a block diagram of an operating environment for Backscatter Device (BKD) placement.

Backscatter Device (BKD) placement and placement calibration may be provided. A plurality of ambient energy sources in a Three-Dimensional (3D) space may be identified and mapped. Each of the plurality of ambient energy sources may be categorized as one of the following: a stationary and controllable ambient energy source, a stationary and uncontrollable ambient energy source, and a mobile ambient energy source. An amount of ambient energy available at each of a plurality of sub-spaces of the 3D space may be determined. The amount of ambient energy available at each of the plurality of sub-spaces may be determined by determining a first amount of ambient energy that is continuously available and a second amount of ambient energy that is likely available at each of the plurality of sub-spaces of the 3D space.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Ambient Power (AMP) Backscatter Devices (BKDs) may use ambient energy, for example, Radio Frequency (RF) signals, to transmit data without a power source such as a battery or a connection to electricity. BKDs may use an antenna to receive a RF signal, use the received RF signal for excitation (e.g., convert the RF signal into electricity), and use the power to modify and reflect the RF signal with data. Other network devices may receive a reflected RF signal transmitted by a BKD to process the data the BKD is sending. BKD operations may be described in documents and standards from the Institute of Electrical and Electronics Engineers (IEEE).

There may be two types of BKDs: passive BKDs (pBKDs) and active BKDs (pBKDs). A pBKD may directly reflect back the energy it receives. An aBKD may include a capacitor and may thus charge until it sends its own frame. As discussed above, BKDs may be powered by ambient energy (for example, RF signals) present in the surrounding environment. A power level the BKDs receive may depend on how well BKDs may be able to receive the ambient energy from ambient energy sources in the surrounding environment. Therefore, a deployment location of a BKD may significantly influence an ability of the BKD to perform. This may especially be true for BKDs where ambient energy may be harvested and stored before being used. The disclosure, therefore, may provide processes for BKD placement and placement calibration that may enable BKDs to receive a maximum possible amount of energy thereby improving BKD's performance. In addition, the BKD placement processes disclosed here may provide backscattered BKD frames from the BKDs to have a best chance to be received by a network device.

FIG. 1 is a block diagram of an operating environment 100 for BKD placement and placement calibration. Operating environment 100 may include a network 105 and a controller 110. Network 105 may include a plurality of network devices, for example, a first Access Point (AP) 120, a second AP 125, a first BKD 130, a second BKD 135, a first station 140, and a second station 145. Network 105 may comprise, but is not limited to, a Wireless Local Area Network (WLAN) in a Three-Dimensional (3D) space 150. 3D space 150 may include a plurality of sub-spaces, for example, a first sub-space 155, a second sub-space, 160, and a third sub-space 165. The plurality of sub-spaces may be unit sub-spaces and may include one or more BKDs, one or more Survey Devices (SDs), and/or one or more stations. For example, first sub-space 155 may comprise first BKD 130, a first SD 175 and a second SD 180. Second sub-space 160 may comprise second BKD 135. Third sub-space 165 may not comprise any BKDs or survey devices.

Controller 110 may be a Wireless LAN Controller (WLC) and may provision and control network 105. Controller 110 may be implemented by a Digital Network Architecture Center (DNAC) controller (i.e., a Software-Defined Network (SDN) controller). Controller 110, first AP 120, and second AP 125 may provide a WLAN. Through this WLAN, first BKD 130, second BKD 135, first station 140, second station 145, first SD 175, and second SD 180 may be provided with access to the Internet or other cloud-based networking environments.

Each first AP 120 and second AP 125 may be compatible with specification standards such as, but not limited to, the IEEE 802.11 specification standard for example. First AP 120 and second AP 125 may communicate with each other and controller 110 to conduct operations in concert to provide network coverage or Wireless Fidelity (WiFi) coverage in 3D space 150. In addition, first AP 120 and second AP 125 may send and receive signals to provide a connection to network 105.

First BKD 130 and second BKD 135 may be devices that can utilize RF signals that first AP 120, second AP 125, first station 140, second station 145, and/or other devices transmit to generate power, modulate or otherwise modify the received signals to encode data, and reflect the modulated signals. First BKD 130 and second BKD 135 may be user devices, Internet-of-Things (IoT) devices, sensors, and/or the like. Each of first BKD 130 and second BKD 135 may be a pBKD or an aBKD.

First station 140 and second station 145 may communicate with first AP 120, second AP 125, first BKD 130, second BKD 135, first SD 175, and second SD 180. In accordance with example embodiments, first station 140 and second station 145 may be devices with a power source, for example, a battery or connected to electrical power. First station 140 and second station 145 may be, for example, a smart phone, a personal computer, a tablet device, a mobile device, a telephone, a remote control device, a set-top box, a digital video recorder, an IoT device, a network computer, a router, an Automated Transfer Vehicle (ATV), a drone, an Unmanned Aerial Vehicle (UAV), or other similar microcomputer-based device.

First SD 175 and second SD 180 may communicate with first AP 120, second AP 125, first BKD 130, second BKD 135, first station 140, and second station 145. Each of first SD 175 and second SD 180 may measure an amount of ambient energy being received at its location and a source of the ambient energy. First SD 175 and second SD 180 may be placed in 3D space 150 to measure ambient energy.

The elements described above of operating environment 100 (e.g., controller 110, first AP 120, second AP 125, first BKD 130, second BKD 135, first station 140, second station 145, first SD 175, and second SD 180) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 4, the elements of operating environment 100 may be practiced in a computing device 400.

Figure 2:
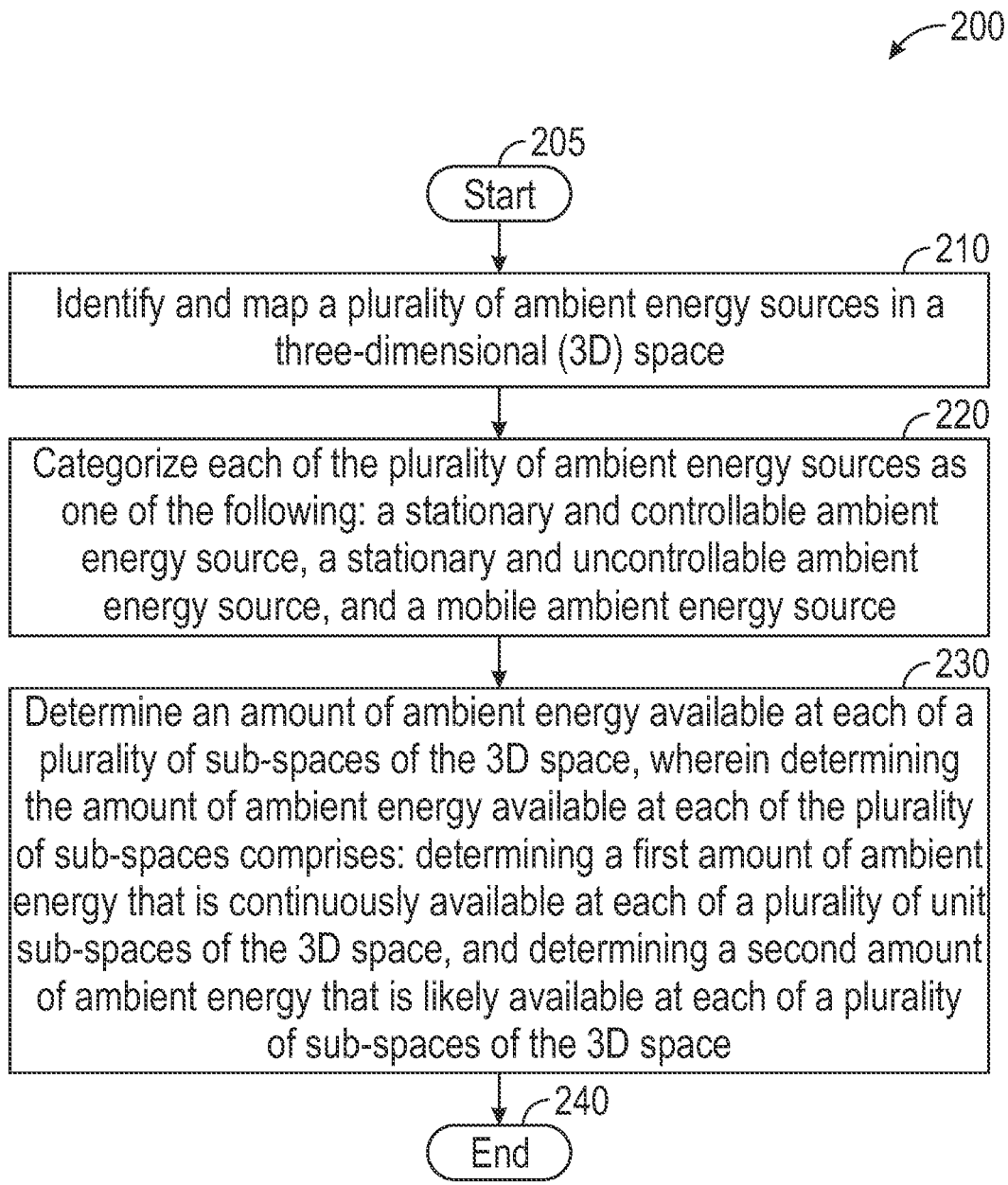
FIG. 2 is a flow chart of a method for BKD placement.

FIG. 2 is a flow chart setting forth the general stages involved in a method 200 consistent with embodiments of the disclosure for BKD placement. Method 200 may be implemented using controller 110 as described in more detail above with respect to FIG. 1. However, method 200 may be implemented using any of first AP 120, second AP 125, first station 140, and second station 145 as described in more detail above with respect to FIG. 1. Ways to implement the stages of method 200 will be described in greater detail below.

Method 200 may begin at starting block 205 and proceed to stage 210 where controller 110 may identify and map a plurality of ambient energy sources in 3D space 150. Location server 115 may perform a RF survey where a RF spectrum may be analyzed in 3D space 150 using survey devices, for example, first SD 175 and second SD 180. In the RF survey, all RF emitters (for example, microwave sources, owned APs (that is, first AP 120 and second AP 125), neighboring network APs, rogue APs, Bluetooth Low Energy (BLE) sources, light sources, Light Fidelity (LiFi) sources, Television (TV) signal sources, any remote controlled sources, etc.) may be identified and mapped. Non-RF sources, for example, heat sources (that is, heat pumps, space heaters, Air Conditioning (AC) systems, etc.), light sources, vibration sources, etc. may also be identified and mapped.

Controller 110 may identify and map the plurality of ambient energy sources in 3D space 150 at a predetermined frequency for a certain time. For example, controller 110 may identify and map the plurality of ambient energy sources every minute or hour of the day for a few weeks or a few months, or few seasons. The mapping of the plurality of ambient energy sources may be stored in a database.

After identifying and mapping the plurality of ambient energy sources in 3D space 150 at stage 210, method 200 may proceed to stage 220 where controller 110 may categorize each of the plurality of ambient energy sources as one of the following: a stationary and controllable ambient energy source, a stationary and uncontrollable ambient energy source, and a mobile ambient energy source. Stationary and controllable ambient energy sources may include LiFi sources, BLE sources, WiFi sources, and any other network devices that may be fixed at a position and controllable by controller 110. Stationary and uncontrollable ambient energy sources may include rogue APs, rogue RF sources, daylight, etc. that may be fixed at a position but are not controllable by controller 110. Mobile ambient energy sources may include sources that may move in and out of 3D space 150 and not controllable by controller 110.

Once having categorized each of the plurality of ambient energy sources at stage 220, method 200 may proceed to stage 230 where controller 110 may determine an amount of ambient energy available at each of a plurality of sub-spaces of 3D space 150. Determining the amount of ambient energy available at each of the plurality of sub-spaces may include determining a first amount of ambient energy that is continuously available and a second amount of ambient energy that is likely available at each of the plurality of sub-spaces of 3D space 150.

Controller 110, for example, may gather the historical data including ambient energy emission pattern from the plurality of ambient energy sources of 3D space 150 over time. The historical data may be used to determine or predict the first amount of ambient energy that is continuously available at each of the plurality of sub-spaces and the second amount of ambient energy that is likely available at each of the plurality of sub-spaces of 3D space 150. For example, a room may temporarily become full of ambient energy sources for a single transient but not predictable event. This may not mean that controller 110 may rely on such room to have that much ambient energy. However, other rooms, for example, a classroom or a movie theater may have ambient energy sources show up on a predicted schedule.

With the classification of ambient energy sources, controller 110 may estimate the amount of ambient energy for each sub-space of 3D space 150 that: is continuously available (for example, from controllable and stationary ambient energy sources) and is likely to be available from transient but predictable energy sources. The amount of ambient energy that is likely to be available may be determined based on availability patterns of uncontrollable stationary ambient energy sources and mobile ambient energy sources. The availability pattern of stationary and uncontrollable ambient energy sources and mobile ambient energy sources may be determined based on historical availability patterns. The amount of ambient energy that is likely available may then be determined based on the predicted availability pattern. The predicted availability pattern may be determined using a machine learning algorithm. After controller 110 determines the amount of energy available at each of the plurality of sub-spaces of 3D space 150 at stage 230, method 200 may terminate at end block 240.

Based on the amount of ambient energy available at each of the plurality of sub-spaces of 3D space 150, controller 110 may create a recommendation to suggest BKD locations at macro scale in 3D space 150. In some examples, controller 110 may provide a BKD energizing (that is, ambient energy) heatmap that may be used to determine BKD locations. The ambient energy heatmap may provide the amount of ambient energy available at different positions in 3D space 150. The ambient energy heatmap may be used to determine optimal positions for placing BKDs.

Controller 110 may provide a different ambient energy heatmap for non-RF ambient energy. For example, controller 110 may provide a vibration energy heatmap, a light energy heatmap, etc. Non-RF ambient energy heatmaps may be used to determine positions of BKDs that may use non-RF ambient energy. First BKD 130, for example, may be placed in 3D space 150 based on the ambient energy heatmap and an energy budget of first BKD 130. The energy budget may depend on a type and a frequency of operation of first BKD 130. For example, first BKD 130 may need less ambient energy if it is configured to send data every minute vs when it is configured to send multiple times every second. Similarly, a BKD with a temperature sensor may need more ambient energy than a BKD with an open/close sensor if a door associated with the open/close sensor is not operated frequently.

Some BKDs may be placed freely. For example, a BKD with a smoke detector may be placed anywhere in a room or on ceiling of a room. However, placement of other BKDs may be constrained. For example, a BKD with an open/close sensor of a door may need to be placed along a frame of the door. The disclosure may provide calibration of BKD placement at constrained positions.

Figure 3:
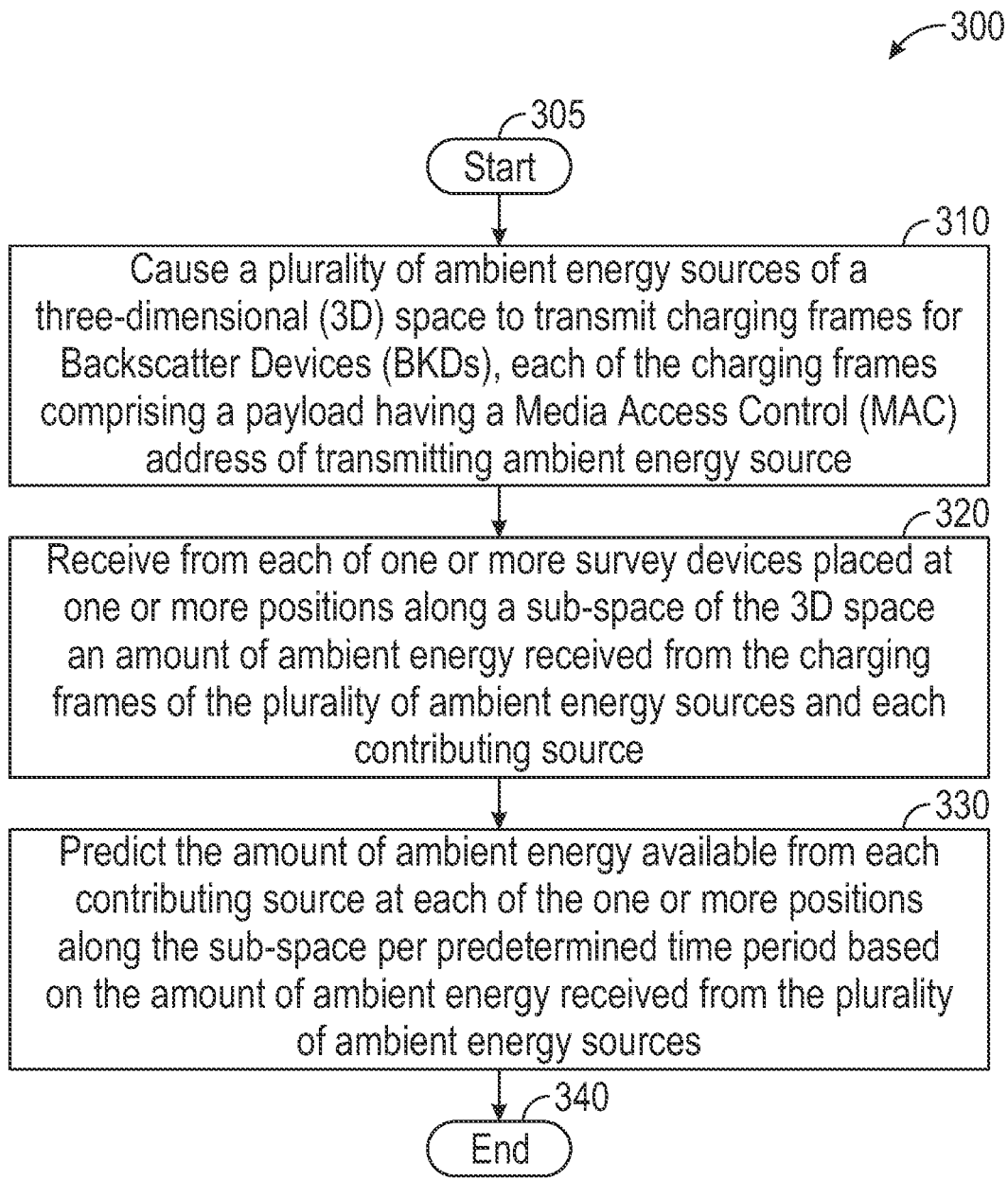
FIG. 3 is a flow chart of a method for BKD placement calibration.

FIG. 3 is a flow chart setting forth the general stages involved in a method 300 consistent with embodiments for BKD placement calibration. Method 300 may be implemented using controller 110 as described in more detail above with respect to FIG. 1. However, method 300 may also be implemented using any of first AP 120, second AP 125, first station 140, and second station 145 as described in more detail above with respect to FIG. 1. Ways to implement the stages of method 300 will be described in greater detail below.

Method 300 may begin at starting block 305 and proceed to stage 310 where controller 110 may cause a plurality of ambient energy sources of 3D space 150 to transmit charging frames for BKDs. Each of the charging frames may comprise a payload having a Media Access Control (MAC) address of transmitting ambient energy source. For example, controller 110 may trigger or instruct first AP 120, second AP 125, first station 140, and second station 145 to transmit charging frames comprising the MAC address of the transmitting device.

Once having instructed the plurality of ambient energy sources to transmit the charging frames at stage 310, method 300 may proceed to stage 320 where controller 110 may receive from one or more survey devices placed at one or more positions along a sub-space of 3D space 150 an amount of ambient energy received from the charging frames of the plurality of ambient energy sources and each contributing source. For example, first SD 175 and second SD 180 may be placed around first sub-space 155 that may be a constrained sub-space for placement of first BKD 130. Each of first SD 175 and second SD 180 may detect the charging frames transmitted by first AP 120, second AP 125, first station 140, and second station 145 and determine a power or intensity of detected charging frames at its respective position.

The charging frames may lose some power (referred to as a path loss) as it travels through the surrounding environment. The path loss may depend on a distance between a transmitting device and a receiving device, any obstruction along a path between the transmitting device and the receiving device, etc. Each of first SD 175 and second SD 180 may determine the amount of ambient energy received from each first AP 120, second AP 125, first station 140, and second station 145 at its respective position from the charging frames and the MAC address included in the charging frames. First SD 175 and second SD 180 may send this information to controller 110.

After determining the amount of ambient energy received from the plurality of ambient energy sources and each contributing source at stage 320, method 300 may proceed to stage 330 where controller 110 may predict the amount of ambient energy available from each contributing source at each of the one or more positions along the sub-space per predetermined time period based on the amount of ambient energy received from the plurality of ambient energy sources. For example, based on a detected signal level of the charging frames from the plurality of ambient energy sources, controller 110 may determine the path loss for each of first AP 120, second AP 125, first station 140, and second station 145 to each of first SD 175 and second SD 180. In addition, controller 110 may determine an operational activity of each of the plurality of ambient energy sources. For example, first AP 120 may send beacons 10 times per second and may reply to each first station 140 and second station 145 with an average channel utilization (CU) of 45%. A wireless video unit may be used on an average of 10% of the time during weekdays with both upstream and downstream packets. A printer may be heavily used, but its traffic may primarily be downstream with only acknowledgement packets and occasional updates for upstream.

Based on the path loss and the operational activity, controller 110 may predict the amount of ambient energy available from each contributing source at each of the one or more positions along first sub-space 155 per predetermined time period, for example, per second, per minute, per hour, etc. Once having predicted the amount of ambient energy available from each contributing source at each of the one or more positions along first sub-space 155, method 300 may terminate at end stage 340.

A type and the ambient energy requirement or the ambient energy budget of first BKD 130 to be placed at first sub-space 155 may be known. Controller 110 may compare the ambient energy budget of first BKD 130 with the predicted amount of ambient energy available from contributing sources at each of the one or more positions around first sub-space 155. Controller 110 then may recommend a position from the one or more positions for placement of first BKD 130 based on the comparison. For example, controller 110 may recommend first BKD 130 to be placed at a first position along first sub-space 155 where the predicted amount of ambient energy available from the contributing sources is greater than the ambient energy budget of first BKD 130.

In accordance with example embodiments, controller 110 may determine an energy gap comprising a difference between the predicted amount of ambient energy available at each of one or more positions or a preferred second position and the ambient energy budget of first BKD 130. If the energy gap is less than zero, then controller 110 may recommend placing first BKD 130 at any of the one or more positions of first sub-space 155. However, if the energy gap is greater than zero, controller 110 may cause at least one ambient energy source of the plurality of ambient energy sources to transmit additional charging frames to cover the energy gap. For example, controller 110 may cause one of first AP 120, second AP 125, first station 140, and second station 145 to transmit additional charging frames. In some examples, controller 110 may recommend adding at least one ambient energy source in 3D space 150 to cover the gap. In another examples, controller 110 may recommend adding an energy input module to first BKD 130. For example, if first BKD 130 is located near a window and receives sunlight, controller 110 may recommend adding a solar energy module to first BKD 130 to cover the energy gap.

In some example embodiments, controller 110 may recommend moving or relocating one of first AP 120 and second AP 125 to cover the energy gap. For moving one of first AP 120 and second AP 125, a convex optimization algorithm may be used to maintain the WiFi coverage while maximizing the ambient energy at positions where first BKD 130 and second BKD 135 are located. This may pose a dual constraint optimization problem. Convex optimizing algorithms implementing Karush-Kuhn-Tucker conditions (for example, a barrier technique, an interior point method, etc.) may be used to provide such optimization. In some examples, optimization of the ambient energy availability may result in a sub-optimal WiFi coverage or vice versa. In such cases, controller 110 may favor WiFi coverage, and then may examine if any of the plurality of ambient energy sources may be caused to send additional charging frames to cover the energy gap. For example, first AP 120 may be caused to send additional charging frames when not sending or receiving data frames. In another example, a printer in network 105 may be caused to send additional charging frames at intervals and medium power causing a moderate and localized increase of airtime utilization in an associate cell. An ambient energy source closer to first BKD 130 may be caused to send the additional charging frames provided any increase in airtime is bounded to a Channel Utilization (CU) value that is configurable.

If first BKD 130 is already placed at a second position, controller 110 may determine the energy gap at the second position and recommend a remedial action to cover the gap. An iterative or a brownfield deployment approach may be employed where a number of BKDs are already deployed and a few more have to be added or a location of the ones already deployed may need to be adjusted. In such scenarios, deployed BKDs may report the ambient energy levels at their positions to controller 110 that in turn may recommend adjusting their positions based on the reported ambient energy levels. Controller 110 may also adjust RF signals emitted from controllable ambient energy sources in order to improve the ambient energy levels.

In some examples, BKDs may be mounted on a moving object, for example, a vehicle. In such scenarios, controller 110 may recommend a route recommendation to the moving object that may provide a certain level of ambient energy availability for the BKDs along the recommended route. Controller 110 may also ensure that enough ambient energy is available along the recommended route based on the ambient energy requirement of the BKDs.

Figure 4:
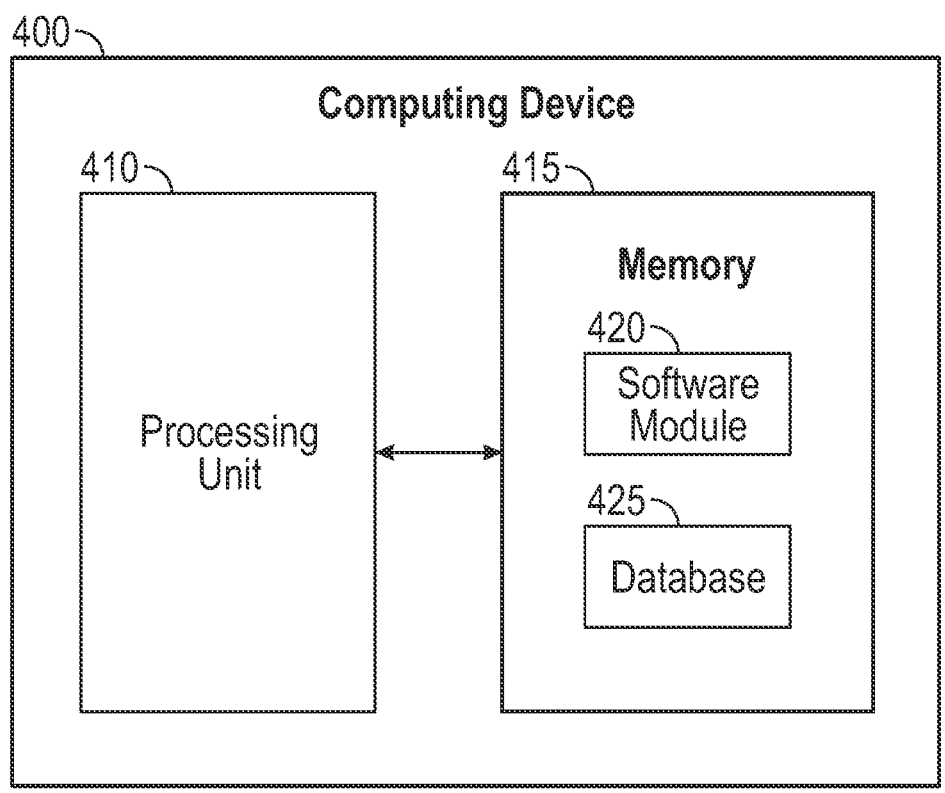
FIG. 4 is a block diagram of a computing device.

FIG. 4 is a block diagram of a computing device 400. As shown in FIG. 4, computing device 400 may include a processing unit 410 and a memory unit 415. Memory unit 415 may include a software module 420 and a database 425. While executing on processing unit 410, software module 420 may perform, for example, processes for BKD placement and calibration described with respect to FIG. 2 and FIG. 3. Computing device 400, for example, may provide an operating environment for controller 110, first AP 120, second AP 125, first BKD 130, second BKD 135, first station 140, and second station 145, and the like. Controller 110, first AP 120, second AP 125, first BKD 130, second BKD 135, first station 140, and second station 145, and the like may operate in other environments and are not limited to computing device 400.

Computing device 400 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 400 may comprise any computer operating environment, such as hand-held devices, multiprocessor systems, microprocessor-based or programmable sender electronic devices, minicomputers, mainframe computers, and the like. Computing device 400 may also be practiced in distributed computing environments where tasks are performed by remote processing devices. The aforementioned systems and devices are examples, and computing device 400 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   identifying and mapping a plurality of ambient energy sources in a Three-Dimensional (3D) space;
   categorizing each of the plurality of ambient energy sources as one of the following: a stationary and controllable ambient energy source, a stationary and uncontrollable ambient energy source, and a mobile ambient energy source; and
   determining an amount of ambient energy available at each of a plurality of sub-spaces of the 3D space, wherein determining the amount of ambient energy available at each of the plurality of sub-spaces comprises:
      determining a first amount of ambient energy that is continuously available at each of the plurality of sub-spaces of the 3D space, and
      determining a second amount of ambient energy that is likely available at each of the plurality of sub-spaces of the 3D space.

2. The method of claim 1, wherein determining the first amount of ambient energy that is continuously available comprises:
   determining the first amount of ambient energy available from stationary and controllable ambient energy sources.

3. The method of claim 1, wherein determining the second amount of ambient energy that is likely available comprises:
   predicting an availability pattern of the stationary and uncontrollable ambient energy sources and the mobile ambient energy sources based on historical availability patterns; and
   determining the second amount of ambient energy that is likely available based on the predicted availability pattern.

4. The method of claim 3, wherein determining the availability pattern of the stationary and uncontrollable ambient energy sources and the mobile ambient energy sources comprises determining the availability pattern of the stationary and uncontrollable ambient energy sources and the mobile ambient energy sources based on historical data of the mapping of the plurality of ambient energy sources in the 3D space.

5. The method of claim 1, further comprising:
categorizing each of the plurality of ambient energy sources as one of the following: a Radio Frequency (RF) source and a non-RF source.

6. The method of claim 1, further comprising:
creating a recommendation to suggest Ambient Power (AMP) Backscatter Device (BKD) device locations for a plurality of AMP BKDs in the 3D space based on the amount of ambient energy available at each of the plurality of sub-spaces of the 3D space and an ambient energy budget of each of the plurality of BKDs.

7. The method of claim 1, wherein identifying and mapping the plurality of ambient energy sources in the 3D space comprises performing a Radio Frequency (RF) survey of the 3D space to determine RF signal emitters in the 3D space.

8. The method of claim 1, wherein identifying and mapping the plurality of ambient energy sources in the 3D space comprises analyzing a Radio Frequency (RF) spectrum in the 3D space to determine RF signal emitters in the 3D space.

9. A system comprising:
a memory storage; and
a processing unit coupled to the memory storage, wherein the processing unit is operative to:
identify and map a plurality of ambient energy sources in a Three-Dimensional (3D) space;
categorize each of the plurality of ambient energy sources as one of the following: a stationary and controllable ambient energy source, a stationary and uncontrollable ambient energy source, and a mobile ambient energy source; and
determine an amount of ambient energy available at each of a plurality of sub-spaces of the 3D space, wherein the processing unit being operative to determine the amount of ambient energy available at each of the plurality of sub-spaces comprises the processing unit being operative to:
determine a first amount of ambient energy that is continuously available at each of the plurality of sub-spaces of the 3D space, and
determine a second amount of ambient energy that is likely available at each of the plurality of sub-spaces of the 3D space.

10. The system of claim 9, wherein the processing unit being operative to determine the first amount of ambient energy that is continuously available comprises the processing unit being operative to:
determine the first amount of ambient energy available from stationary and controllable ambient energy sources.

11. The system of claim 9, wherein the processing unit being operative to determine the second amount of ambient energy that is likely available comprises the processing unit being operative to:
predict an availability pattern of the stationary and uncontrollable ambient energy sources and the mobile ambient energy sources based on historical availability patterns; and
determine the second amount of ambient energy that is likely available based on the predicted availability pattern.

12. The system of claim 11, wherein the processing unit being operative to determine the availability pattern of the stationary and uncontrollable ambient energy sources and the mobile ambient energy sources comprises the processing unit being operative to determine the availability pattern of the stationary and uncontrollable ambient energy sources and the mobile ambient energy sources based on historical data of the mapping of the plurality of ambient energy sources in the 3D space.

13. The system of claim 9, wherein the processing unit is further operative to:
categorize each of the plurality of ambient energy sources as one of the following: a Radio Frequency (RF) source and a non-RF source.

14. The system of claim 9, wherein the processing unit is further operative to:
creating a recommendation to suggest Ambient Power (AMP) Backscatter Device (BKD) device locations for a plurality of AMP BKDs in the 3D space based on the amount of ambient energy available at each of the plurality of unit sub-spaces of the 3D space and an ambient energy budget of each of the plurality of BKDs.

15. A non-transitory computer-readable medium that stores a set of instructions which when executed perform a method comprising:
identifying and mapping a plurality of ambient energy sources in a Three-Dimensional (3D) space;
categorizing each of the plurality of ambient energy sources as one of the following: a stationary and controllable ambient energy source, a stationary and uncontrollable ambient energy source, and a mobile ambient energy source; and
determining an amount of ambient energy available at each of a plurality of sub-spaces of the 3D space, wherein determining the amount of ambient energy available at each of the plurality of sub-spaces comprises:
determining a first amount of ambient energy that is continuously available at each of the plurality of sub-spaces of the 3D space, and
determining a second amount of ambient energy that is likely available at each of the plurality of sub-spaces of the 3D space.

16. The non-transitory computer-readable medium of claim 15, wherein determining the first amount of ambient energy that is continuously available comprises: determining the first amount of ambient energy available from stationary and controllable ambient energy sources.

17. The non-transitory computer-readable medium of claim 15, wherein determining the second amount of ambient energy that is likely available comprises:
predicting an availability pattern of the stationary and uncontrollable ambient energy sources and the mobile ambient energy sources based on historical availability patterns; and
determining the second amount of ambient energy that is likely available based on the predicted availability pattern.

18. The non-transitory computer-readable medium of claim 17, wherein determining the availability pattern of the stationary and uncontrollable ambient energy sources and the mobile ambient energy sources comprises determining the availability pattern of the stationary and uncontrollable ambient energy sources and the mobile ambient energy sources based on historical data of the mapping of the plurality of ambient energy sources in the 3D space.

19. The non-transitory computer-readable medium of claim 15, further comprising:
categorizing each of the plurality of ambient energy sources as one of the following: a Radio Frequency (RF) source and a non-RF source.

20. The non-transitory computer-readable medium of claim 15, further comprising:

creating a recommendation to suggest Ambient Power (AMP) Backscatter Device (BKD) device locations for a plurality of AMP BKDs in the 3D space based on the amount of ambient energy available at each of the plurality of sub-spaces of the 3D space and an ambient energy budget of each of the plurality of BKDs.

* * * * *